United States Patent Office 3,321,473
Patented May 23, 1967

3,321,473
NOVEL 5,6-DIHYDRO-11H-PYRIDO[2,3-b][1,4]
BENZODIAZEPINES
Günther Schmidt, Biberach an der Riss, Germany, assignor to Boehringer Ingelheim G.m.b.H., Ingelheim am Rhine, Germany, a corporation of Germany
No Drawing. Filed July 22, 1964, Ser. No. 384,521
Claims priority, application Germany, Aug. 22, 1963,
T 24,551
9 Claims. (Cl. 260—247.5)

This invention relates to novel substitution products of 5,6 - dihydro-11H-pyrido[2,3-b][1,4]benzodiazepines and acid addition salts thereof, as well as to various methods of preparing these compounds.

More particularly, the present invention relates to 5,6-dihydro - 11H-pyrido[2,3-b][1,4]benzodiazepines of the formula

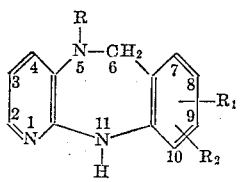

(I)

wherein

R is hydrogen, or a straight or branched alkyl radical which may have a halogen, hydroxyl, lower alkoxy or basic substituent of the formula

where $R_3$ and $R_4$, which may be identical to or different from each other, are lower alkyl or, together with each other and the adjacent nitrogen atom, form a basic heterocyclic ring, attached thereto, or a cycloalkyl radical or an aralkyl radical whose aromatic moiety may have one or more halogen, lower alkyl or lower alkoxy substituents attached thereto, and $R_1$ and $R_2$, which may be identical to or different from each other, are hydrogen or halogen, lower alkyl or lower alkoxy substituents, and their non-toxic, pharmacologically acceptable acid addition salts.

The compounds embraced by Formula I may be prepared by reducing a 5,6-dihydro-6-oxo-11H-pyrido[2,3-b][1,4]benzodiazepine of the formula

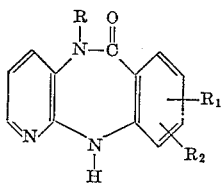

(II)

wherein R, $R_1$ and $R_2$ have the same meanings as in Formula I. The reduction may be accomplished by a number of known methods, of which the following are most convenient and efficient:

(a) Most preferred is the reduction with lithium aluminum hydride in the presence of an inert, anhydrous organic solvent, such as ether, tetrahydrofuran or dioxane, at moderately elevated temperatures, most advantageously at the boiling point of the particular solvent. In the event that the starting compound II is difficultly soluble in the particular solvent, it may be gradually dissolved in an extraction apparatus, such as a Thielepape extractor, and the solution may be introduced into the reduction vessel at the rate that it is formed in the extracor.

(b) The reduction of a compound of the Formula II may also be effected with hydrogen in the presence of a catalyst, especially a copper-chromium oxide catalyst, in an inert organic solvent, such as dioxane, at a temperature between 100 and 250° C. and a pressure between 100 and 250 atmospheres gauge.

(c) Finally the reduction may also be effected with an alkali metal in an absolute lower alkanol, especially ethanol, by the Bouveault-Blanc method [Compt. Rend. 136, 1676 (1903)].

The free bases of the Formula I obtained by any of these reduction methods may subsequently be converted into their non-toxic, pharmacologically acceptable acid addition salts with inorganic or organic acids. Those compounds wherein R is other than a basic substituent form acid addition salts with one equivalent of an acid, and those wherein R is a basic substituent form acid addition salts with one or two equivalents of an acid.

Examples of non-toxic, pharmacologically acceptable acid addition salts are those formed with hydrochloric acid, sulfuric acid, phosphorus acid, tartaric acid, maleic acid, fumaric acid, succinic acid, citric acid, 8-chlorotheophylline and the like.

The starting compounds of the Formula II above are either described in copending applications Ser. No. 320,935, filed Nov. 1, 1963, and Ser. No. 369,628, filed May 22, 1964, or may be prepared by methods analogous to those described in said copending applications.

The following examples further illustrate the present invention and will enable others skilled in the art to understand the invention more completely. It should be understood, however, that my invention is not limited to the specific examples given below.

EXAMPLE 1

Preparation of 5-ethyl-5,6-dihydro-11H-pyrido[2,3-b][1,4]benzodiazepine by reduction with lithium aluminum hydride 4.2 gm. of 5-ethyl-5,6-dihydro-6-oxo-11H-pyrido[2,3-b][1,4]benzodiazepine were extracted with absolute tetrahydrofuran over a period of five hours from a Thielepape extractor into a round-bottom flask which contained a solution of 1.5 gm. of lithium aluminum hydride in 100 cc. of absolute tetrahydrofuran. After the extraction was completed, the reaction mixture was refluxed for one hour and was then allowed to cool. Thereafter, it was decomposed into an aqueous phase and an organic phase by adding first aqueous tetrahydrofuran and then an aqueous potassium tartrate solution. The organic phase was separated and evaporated in vacuo. The residue was an oil which was distilled in vacuo, whereupon it had a boiling point of 150–153° C. at 0.08 mm. Hg. It crystallized upon being stirred with ligroin. The crystalline mass was recrystallized from ligroin, yielding about 60% of theory of the compound of the formula

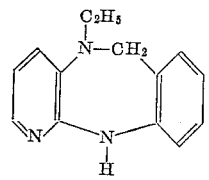

having a melting point of 84–86° C.

Analysis.—$C_{14}H_{15}N_3$; molecular weight 225.3. Calculated: C, 74.64%; H, 6.71%; N, 18.65%. Found: C, 74.70%; H, 6.84%; N, 18.35%.

EXAMPLE 2

Using a procedure analogous to that described in Example 1, 5,6-dihydro-11H-pyrido[2,3-b][1,4]benzodiazepine of the formula

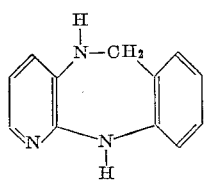

was prepared by reduction of 6-oxo-5,6-dihydro-11H-pyrido[2,3-b][1,4]benzodiazepine with lithium aluminum hydride. Recrystallized from carbon tetrachloride, the product had a melting point of 144–145° C.

*Analysis.*—$C_{12}H_{11}N_3$; molecular weight 197.2. Calculated: C, 73.07%; H, 5.62%; N, 21.31%. Found: C, 72.90%; H, 5.65%; N, 21.05%.

EXAMPLE 3

Using a procedure analogous to that described in Example 1, 5-methyl-5,6-dihydro-11H-pyrido[2,3-b][1,4]benzodiazepine, M.P. 95° C. after recrystallization from isopropanol, was prepared by reduction of 5-methyl-6-oxo-5,6-dihydro-11H-pyrido[2,3-b][1,4]benzodiazepine with lithium aluminum hydride.

*Analysis.*—$C_{13}H_{13}N_3$; molecular weight 211.3. Calculated: N, 19.89%. Found: N, 19.80%.

EXAMPLE 4

Using a procedure analogous to that described in Example 1, 5-(β-dimethylamino-ethyl)-5,6-dihydro-11H-pyrido[2,3-b][1,4]benzodiazepine of the formula

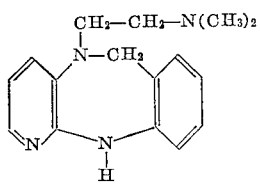

was prepared by reduction of 5-(β-dimethylamino-ethyl)-6-oxo-5,6-dihydro-11H-pyrido[2,3-b][1,4]benzodiazepine with lithium aluminum hydride.

The dihydrochloride, obtained by adding two equivalents of hydrochloric acid to a solution of the free base in ligroin, had a melting point of 230° C. (decomposition) after recrystallization from isopropanol.

*Analysis.*—$C_{16}H_{22}Cl_2N_4$; molecular weight 341.3. Calculated: C, 56.29%; H, 6.50%; Cl, 20.77%. Found: C, 56.20%; H, 6.61%; Cl, 20.20%.

EXAMPLE 5

Using a procedure analogous to that described in Example 1, 5,6-dihydro-9-chloro-11H-pyrido[2,3-b][1,4]benzodiazepine of the formula

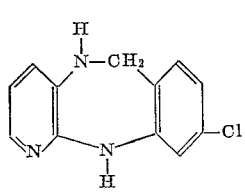

was prepared by reduction of 5,6-dihydro-6-oxo-9-chloro-11H-pyrido[2,3-b][1,4]benzodiazepine with lithium aluminum hydride. Recrystallized from ethanol, the product had a melting point of 182–183° C.

*Analysis.*—$C_{12}H_{10}ClN_3$; molecular weight 231.7. Calculated: Cl, 15.30%. Found: Cl, 15.05%.

EXAMPLE 6

Using a procedure analogous to that described in Example 1, 5-methyl-9-chloro-5,6-dihydro-11H-pyrido[2,3-b][1,4]benzodiazepine was prepared by reduction of 5-methyl-9-chloro-6-oxo-5,6-dihydro-11H-pyrido[2,3-b][1,4]benzodiazepine with lithium aluminum hydride. Recrystallized from ethanol, the product had a melting point of 104–106° C.

*Analysis.*—$C_{13}H_{12}ClN_3$; molecular weight 245.7. Calculated: Cl, 14.43%. Found: Cl, 14.10%.

EXAMPLE 7

Using a procedure analogous to that described in Example 1, 5-ethyl-9-chloro-5,6-dihydro-11H-pyrido[2,3-b][1,4]benzodiazepine was prepared by reduction of 5-ethyl-6-oxo-9-chloro-5,6-dihydro-11H-pyrido[2,3-b][1,4]benzodiazepine with lithium aluminum hydride. Recrystallized from ethanol, the product had a melting point of 92–94° C.

*Analysis.*—$C_{14}H_{14}ClN_3$; molecular weight 259.7. Calculated: Cl, 13.65%. Found: Cl, 13.07%.

EXAMPLE 8

Using a procedure analogous to that described in Example 1, 5-n-propyl-9-chloro-5,6-dihydro-11H-pyrido[2,3-b][1,4]benzodiazepine was prepared by reduction of 5-n-propyl-9-chloro-6-oxo-5,6-dihydro-11H-pyrido[2,3-b][1,4]benzodiazepine with lithium aluminum hydride. The raw product had a boiling point of 173–175° C. at 0.05 mm. Hg; recrystallized from gasoline, it had a melting point of 78–79° C.

Its hydrochloride had a melting point of 198–201° C. (decomposition) after recrystallization from ethanol.

*Analysis.*—$C_{15}H_{16}ClN_3$; molecular weight 273.8. Calculated: Cl, 13.01%. Found: Cl, 12.71%.

EXAMPLE 9

Using a procedure analogous to that described in Example 1, 5-benzyl-9-chloro-5,6-dihydro-11H-pyrido[2,3-b][1,4]benzodiazepine of the formula

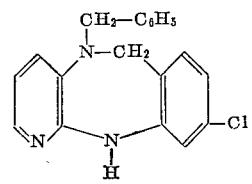

was prepared by reduction of 5-benzyl-6-oxo-9-chloro-5,6-dihydro-11H-pyrido[2,3-b][1,4]benzodiazepine with lithium aluminum hydride. Recrystallized from ethanol, the product had a melting point of 136° C.

*Analysis.*—$C_{19}H_{16}ClN_3$; molecular weight 321.8. Calculated: Cl, 11.05%. Found: Cl, 11.31%.

EXAMPLE 10

Using a procedure analogous to that described in Example 1, 5-(β-dimethylamino-ethyl)-9-chloro-5,6-dihydro-11H-pyrido[2,3-b][1,4]benzodiazepine was prepared by reduction of 5-(β-dimethylamino-ethyl)-6-oxo-9-chloro-5,6-dihydro-11H-pyrido[2,3-b][1,4]benzodiazepine with lithium aluminum hydride. Recrystallized from gasoline, the product had a melting point of 99–101° C.

*Analysis.*—$C_{16}H_{19}ClN_4$; molecular weight 302.8. Calculated: Basic N, 9.24%; Cl, 11.75%. Found: Basic N, 9.31%; Cl, 11.45%.

EXAMPLE 11

Using a procedure analogous to that described in Example 1, 8-methyl-5-6-dihydro-11H-pyrido[2,3-b][1,4]
benzodiazepine of the formula

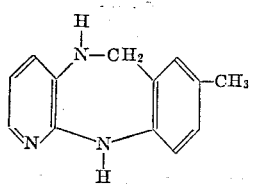

was prepared from 6-oxo-8-methyl-5,6-dihydro-11H-pyrido[2,3-b][1,4]benzodiazepine by reduction with lithium aluminum hydride. The product had a melting point of 159–160° C. after recrystallization from ethanol.

*Analysis.*—$C_{13}H_{13}N_3$; molecular weight 211.3. Calculated: C, 73.90%; H, 6.20%; N, 19.90%. Found: C, 73.80%; H, 6.34%; N, 19.92%.

EXAMPLE 12

Using a procedure analogous to that described in Example 1, 5,8-dimethyl-5,6-dihydro-11H-pyrido[2,3-b][1,4]benzodiazepine was prepared by reduction of 5,8-dimethyl-6-oxo-5,6-dihydro-11H-pyrido[2,3-b][1,4]benzodiazepine with lithium aluminum hydride. Recrystalized from ethanol, the base had a melting point of 120–123° C.

*Analysis.*—$C_{14}H_{15}N_3$; molecular weight 225.3. Calculated: C, 74.64%; H, 6.71%. Found: C, 74.80%; H, 6.88%.

Its hydrochloride had a melting point of 228–230° C. (decomposition) after recrystallization from ethanol.

*Analysis.*—$C_{14}H_{16}ClN_3$; molecular weight 261.7. Calculated: C, 64.23%; H, 6.16%; Cl, 13.55%. Found: C, 64.15%; H, 6.46%; Cl, 13.33%.

EXAMPLE 13

Using a procedure analogous to that described in Example 1, 5-ethyl-8-methyl-5,6-dihydro-11H-pyrido[2,3-b][1,4]benzodiazepine was prepared by reduction of 5-ethyl-6-oxo-8-methyl-5,6-dihydro-11H-pyrido[2,3-b][1,4]benzodiazepine with lithium aluminum hydride. Recrystallized from petroleum ether, the product had a melting point of 114–116° C.

*Analysis.*—$C_{15}H_{17}N_3$; molecular weight 239.3. Calculated: C, 75.28%; H, 7.16%; N, 17.56%. Found: C, 75.10%; H, 7.22%; N, 17.85%.

EXAMPLE 14

Using a procedure analogous to that described in Example 1, 5-isobutyl-5,6-dihydro-11H-pyrido[2,3-b][1,4]benzodiazepine was prepared by reduction of 5-isobutyl-6-oxo-5,6-dihydro-11H-pyrido[2,3-b][1,4]benzodiazepine with lithium aluminum hydride. Recrystallized from methanol, the product had a melting point of 95–97° C.

*Analysis.*—$C_{16}H_{19}N_3$; molecular weight 253.3. Calculated: C, 75.84%; H, 7.57%; N, 16.59%. Found: C, 76.00%; H, 7.62%; N, 16.36%.

EXAMPLE 15

Using a procedure analogous to that described in Example 1, 5-(γ-dimethylamino-n-propyl)-5,6-dihydro-11H-pyrido[2,3-b][1,4]benzodiazepine was prepared by reduction of 5-(γ-dimethylamino-n-propyl)-6-oxo-5,6-dihydro-11H-pyrido[2,3-b][1,4]benzodiazepine with lithium aluminum hydride. The raw product had a boiling point of 180° C. at 0.15 mm. Hg. Recrystallized from petroleum ether, it had a melting point of 89–91° C.

*Analysis.*—$C_{17}H_{22}N_4$; molecular weight 282.4. Calculated: C, 72.30%; H, 7.85%; N, 19.85%. Found: C, 71.95%; H, 8.05%; N, 20.00%.

EXAMPLE 16

Using a procedure analogous to that described in Example 1, 5-benzyl-5,6-dihydro-11H-pyrido[2,3-b][1,4]benzodiazepine was prepared by reduction of 5-benzyl-6-oxo-5,6-dihydro-11H-pyrido[2,3-b][1,4]benzodiazepine with lithium aluminum hydride. Recrystallized from ethanol, the product had a melting point of 138–139° C.

*Analysis.*—$C_{19}H_{17}N_3$; molecular weight 287.3. Calculated: N, 14.63%. Found: N, 14.75%.

EXAMPLE 17

Using a procedure analogous to that described in Example 1, 5-(β-morpholino-ethyl)-5,6-dihydro-11H-pyrido[2,3-b][1,4]benzodiazepine of the formula

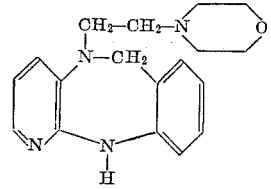

was prepared by reduction of 5-(β-morpholino-ethyl)-6-oxo-5,6-dihydro-11H-pyrido[2,3-b][1,4]benzodiazepine with lithium aluminum hydride. Recrystallized from ethanol, the product had a melting point of 138–139° C.

*Analysis.*—$C_{18}H_{22}N_4O$; molecular weight 310.4. Calculated: C, 69.65%; H, 7.15%; N, 18.05%. Found: C, 69.50%; H, 7.31%; N, 18.25%.

EXAMPLE 18

Using a procedure analogous to that described in Example 1, 5-[γ-(N'-methyl-piperazino)-n-propyl]-5,6-dihydro-11H-pyrido[2,3-b][1,4]benzodiazepine of the formula

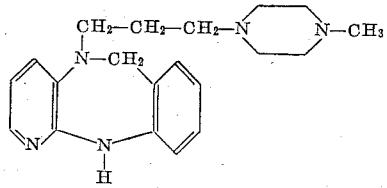

was prepared by reduction of 5-[γ-(N'-methyl-piperazino)-n-propyl]-6-oxo-5,6-dihydro-11H-pyrido[2,3-b][1,4]benzodiazepine with lithium aluminum hydride. The product had a boiling point of 214° C. at 0.01 mm. Hg.

*Analysis.*—$C_{20}H_{27}N_5$; molecular weight 337.5. Calculated: C, 71.18%; H, 8.07%; N, 20.75%. Found: C, 71.60%; H, 8.31%; N, 20.83%.

EXAMPLE 19

Using a procedure analogous to that described in Example 1, 5-(β-methoxyethyl)-5,6-dihydro-11H-pyrido[2,3-b][1,4]benzodiazepine of the formula

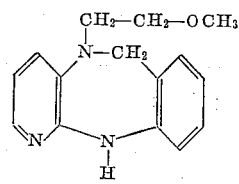

was prepared by reduction of 5-(β-methoxyethyl)-6-oxo-5,6-dihydro-11H-pyrido[2,3-b][1,4]benzodiazepine with lithium aluminum hydride. Recrystallized from ethanol, the product had a melting point of 83–86° C.

*Analysis.*—$C_{15}H_{17}N_3O$; molecular weight 255.3. Calculated: C, 70.56%; H, 6.71%; N, 16.46%. Found: C, 70.75%; H, 6.86%; N, 16.53%.

EXAMPLE 19A

Using a procedure analogous to that described in

Example 1, 5-(β-piperidino-ethyl)-5,6-dihydro-11H-pyrido[2,3-b][1,4]benzodiazepine of the formula

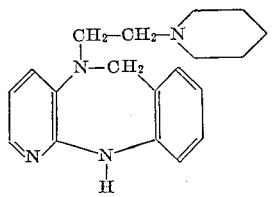

was prepared by reduction of 5-(β-piperidino-ethyl)-6-oxo-5,6-dihydro-11H-pyrido[2,3-b][1,4]benzodiazepine with lithium aluminum hydride. The product had a boiling point of 208–210° C. at 0.04 mm. Hg.

*Analysis.*—$C_{19}H_{24}N_4$; molecular weight 308.43. Calculated: C, 73.99%; H, 7.84%; N, 18.17%. Found: C, 74.00%; H, 7.60%; N, 17.88%.

The compounds according to the present invention, that is, those embraced by Formula I and their non-toxic, pharmacologically acceptable acid addition salts, have useful pharmacodynamic properties. More particularly, they exhibit antitussive, antipyretic, antiphlogistic, and bronchial secretion-promoting activities in animals. Moreover, those compounds of the Formula I wherein R is a basic substituent and their non-toxic acid addition salts also exhibit anti-histaminic activities and antagonize the sedative activity of reserpine in animals.

For therapeutic purposes the compounds of the present invention are administered perorally or parenterally as active ingredients in dosage unit compositions consisting essentially of an inert, physiologically compatible carrier and one dosage unit of the active ingredient, such as tablets, coated pills, syrups, solutions, suspensions, suppositories, hypodermic solutions, and the like. One dosage unit of the compounds of the present invention is from 30 to 100 mgm., preferably 50 mgm.

The following examples illustrate a few dosage unit compositions comprising a compound of the invention as an active ingredient. The parts are parts by weight unless otherwise specified.

EXAMPLE 20

Coated pills

The pill core composition is compounded from the following ingredients:

| | Parts |
|---|---|
| 5,8-dimethyl-5,6-dihydro-11H-pyrido[2,3-b][1,4]benzodiazepine hydrochloride | 50.0 |
| Second. calcium phosphate | 130.0 |
| Corn starch | 26.0 |
| Polyvinylpyrrolidone | 10.0 |
| Tartaric acid | 2.0 |
| Talcum | 10.0 |
| Magnesium stearate | 2.0 |
| Total | 230.0 |

Compounding procedure:

The pyridobenzodiazepine compound is thoroughly admixed with the calcium phosphate and the corn starch, the resulting mixture is moistened with an aqueous 20% solution of the polyvinylpyrrolidone which also has the tartaric acid dissolved therein, and the moist mass is granulated by passing it through a 1.5 mm.-mesh screen. The granulate is dried at 45° C., again passed through the screen, and is then admixed with the talcum and the magnesium stearate. The mixture is subsequently pressed into 230 mgm. pill cores, which are thereafter coated with a thin shell consisting essentially of sugar and talcum. The coated pills are finally polished with beeswax. Each pill core weighs approximately 300 mgm. and contains 50 mgm. of the active ingredient.

EXAMPLE 21

Syrup

The syrup composition is compounded from the following ingredients:

| | Parts |
|---|---|
| 5,8-dimethyl-5,6-dihydro-11H-pyrido[2,3-b][1,4]benzodiazepine hydrochloride | 0.5 |
| Sugar | 70.0 |
| Tartaric acid | 0.3 |
| Second. sodium phosphate·$12H_2O$ | 2.4 |
| Saccharin sodium | 0.2 |
| p-Hydroxybenzoic acid methyl ester | 0.07 |
| p-Hydroxybenzoic acid propyl ester | 0.03 |
| Flavorings | 0.13 |
| Ethanol, pure | 2.0 |
| Distilled water, q.s. ad 100.0 parts by volume. | |

Compounding procedure:

About 50 parts by volume of distilled water are heated to 80° C., and the p-hydroxybenzoic acid esters, the sugar, the saccharin sodium, the tartaric acid, the sodium phosphate and the pyridobenzodiazepine compound are dissolved therein. The solution is allowed to cool, and then a solution of the flavorings in the ethanol is stirred in. The solution is diluted with distilled water to the desired volume and is filtered until clear. 10 cc. of the resulting syrup (about 2 teaspoons full) contain 50 mgm. of the active ingredient.

EXAMPLE 22

Drop solution

The solution is compounded from the following ingredients:

| | Parts |
|---|---|
| 5,8-dimethyl-5,6-dihydro-11H-pyrido[2,3-b][1,4]benzodiazepine hydrochloride | 5.0 |
| p-Hydroxybenzoic acid methyl ester | 0.035 |
| p-Hydroxybenzoic acid propyl ester | 0.015 |
| Anise oil | 0.05 |
| Menthol | 0.06 |
| Saccharin sodium | 1.0 |
| Glycerin | 10.1 |
| Ethanol | 40.4 |
| Distilled water, q.s. ad 100.0 parts by volume. | |

Compounding procedure:

The p-hydroxybenzoic acid esters, the anise oil and the menthol are dissolved in the ethanol. To the resulting solution the pyridobenzodiazepine compound, the glycerin and a solution of the saccharin sodium in the required amount of distilled water are added. The finished solution is filtered until clear. 1 cc. of the solution (about five drops) contains 50 mgm. of the active ingredient.

EXAMPLE 23

Suppositories

The suppository composition is compounded from the following ingredients:

| | Parts |
|---|---|
| 5,8-dimethyl-5,6-dihydro-11H-pyrido[2,3-b][1,4]benzodiazepine hydrochloride | 50.0 |
| Cocoa butter | 1650.0 |
| Total | 1700.0 |

Compounding procedure:

The cocoa butter is melted and at 40° C. the finely powdered pyridobenzodiazepine compound is stirred in, and the mixture is homogenized. The homogeneous composition is cooled to about 33° C. and is poured into cooled suppository molds, each holding 1700 mgm. of the composition. Each suppository contains 50 mgm. of the active ingredient.

Although the above examples illustrate dosage unit compositions comprising only one of the compounds according to the present invention as an active ingredient, it should be understood that any of the other compounds embraced by Formula I or a non-toxic acid addition salt thereof may be substituted for the active ingredient in Examples 20 to 23. Moreover, the amount of active ingredient may be varied within the above indicated limits, as may be the amounts and nature of the inert pharmaceutical carrier materials.

While the present invention has been illustrated with the aid of certain specific embodiments thereof, it will be readily apparent to others skilled in the art that my invention is not limited to those embodiments and that various changes and modifications may be made without departing from the spirit of the invention or the scope of the appended claims.

I claim:

1. A compound selected from the group consisting of 5,6 - dihydro - 11H - pyrido[2,3-b][1,4]benzodiazepine substitution products of the formula

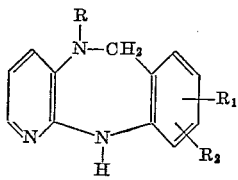

wherein
R is selected from the group consisting of hydrogen, lower alkyl, lower alkoxy-lower alkyl, phenyl-lower alkyl and

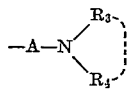

where A is lower alkylene and
$R_3$ and $R_4$ are each selected from the group consisting of lower alkyl and, together with each other and the adjacent nitrogen atom, a basic heterocycle selected from the group consisting of morpholino, piperidino and N'-methyl-piperazino, and
$R_1$ and $_2R$ are each selected from the group consisting of hydrogen, chlorine and methyl,
and their non-toxic, pharmacologically acceptable acid addition salts.

2. A compound selected from the group consisting of 5,6 - dihydro - 11H - pyrido[2,3-b][1,4]benzodiazepine substitution products of the formula

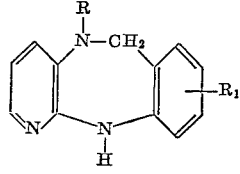

wherein
R is selected from the group consisting of hydrogen, lower alkyl, lower alkoxy-lower alkyl, benzyl and

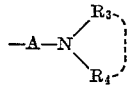

where A is lower alkylene and
$R_3$ and $R_4$ are each selected from the group consisting of methyl and, together with each other and the adjacent nitrogen atom, a basic heterocycle selected from the group consisting of morpholino, piperidino and N'-methyl-piperazino, and
$R_1$ is selected from the group consisting of hydrogen, chlorine and methyl,
and their non-toxic, pharmacologically acceptable acid addition salts.

3. A compound selected from the group consisting of 5,6 - dihydro - 11H - pyrido[2,3-b][1,4]benzodiazepine substitution products of the formula

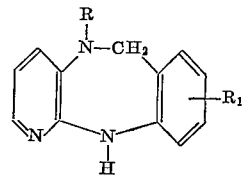

wherein
R is selected from the group consisting of hydrogen, lower alkyl, lower alkoxy-lower alkyl and benzyl, and
$R_1$ is selected from the group consisting of hydrogen, chlorine and methyl,
and their non-toxic, pharmacologically acceptable acid addition salts.

4. A compound selected from the group consisting of 5,6 - dihydro - 11H - pyrido[2,3-b][1,4]benzodiazepine substitution products of the formula

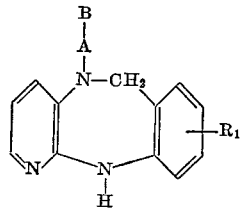

wherein
A is lower alkylene,
B is selected from the group consisting of dimethylamino, morpholino, piperidino and N'-methyl-piperazino, and
$R_1$ is selected from the group consisting of hydrogen, chlorine and methyl,
and their non-toxic, pharmacologically acceptable acid addition salts.

5. 5,8 - dimethyl - 5,6 - dihydro - 11H - pyrido[2,3-b][1,4]benzodiazepine.

6. 5 - ethyl - 8 - methyl - 5,6 - dihydro-11H-pyrido[2,3-b][1,4]benzodiazepine.

7. 5 - (β - dimethylamino - ethyl)-5,6-dihydro-11H-pyrido[2,3-b][1,4]benzodiazepine.

8. 8 - methyl - 5,6 - dihydro - 11H-pyrido[2,3-b][1,4]benzodiazepine.

9. 5 - (β - morpholino - ethyl) - 5,6 - dihydro-11H-pyrido[2,3-b][1,4]benzodiazepine.

No references cited.

NICHOLAS S. RIZZO, *Primary Examiner.*
JOSE TOVAR, *Assistant Examiner.*